(12) United States Patent
Kuhl

(10) Patent No.: US 7,029,152 B1
(45) Date of Patent: Apr. 18, 2006

(54) VEHICULAR LIGHTING ARRANGEMENT WITH INFINITY EFFECT

(75) Inventor: Larry Kuhl, Cumberland, WI (US)

(73) Assignee: Kuhl Reflections, Inc., Cumberland, WI (US)

( * ) Notice: Subject to any disclaimer, the term of this patent is extended or adjusted under 35 U.S.C. 154(b) by 195 days.

(21) Appl. No.: 10/764,204

(22) Filed: Jan. 23, 2004

(51) Int. Cl.
*B60Q 3/04* (2006.01)

(52) U.S. Cl. .................. 362/489; 362/140; 472/63

(58) Field of Classification Search ........... 362/494, 362/489, 298, 540, 545; 472/63
See application file for complete search history.

(56) References Cited

U.S. PATENT DOCUMENTS

| | | | |
|---|---|---|---|
| 2,286,247 A * | 6/1942 | Yearta | ............... 40/219 |
| 2,761,056 A | 8/1956 | Lazo | |
| 4,164,823 A | 8/1979 | Marsico | |
| 4,177,634 A * | 12/1979 | Calienes | ............... 368/232 |
| 4,761,004 A | 8/1988 | Hargabus | |
| 4,991,064 A | 2/1991 | Clem | |
| 5,787,618 A | 8/1998 | Mullis | |
| 5,788,579 A | 8/1998 | Cherry et al. | |
| 5,810,465 A | 9/1998 | Hargabus | |
| 5,951,143 A | 9/1999 | Ginsberg | |
| 6,152,590 A * | 11/2000 | Furst et al. | ............... 362/545 |
| 6,299,337 B1 * | 10/2001 | Bachl et al. | ............... 362/545 |
| 6,386,735 B1 | 5/2002 | Lin | |
| 6,508,562 B1 | 1/2003 | Venkatram et al. | |
| 6,578,299 B1 * | 6/2003 | Burnside et al. | ............... 40/427 |
| 6,637,917 B1 * | 10/2003 | Schwanz et al. | ............... 362/487 |

* cited by examiner

*Primary Examiner*—Ali Alavi
*Assistant Examiner*—Hargobind S. Sawhney
(74) *Attorney, Agent, or Firm*—Andrus, Sceales, Starke & Sawall, LLP

(57) ABSTRACT

A vehicular lighting housing utilizes a combination of a two-way mirror, a strip of LEDs, a one-way mirror spaced from the two-way mirror, and a cover glass such that when the LEDs are illuminated, light reflects back and forth between the two-way mirror and the one-way mirror to present a series of constantly converging light streams forming an endless tunnel of light.

17 Claims, 5 Drawing Sheets

VEHICULAR LIGHTING ARRANGEMENT WITH INFINITY EFFECT

FIELD OF THE INVENTION

The present invention relates broadly to a special effect illumination apparatus and, more particularly, pertains to a lighting display used in various vehicles to provide a three dimensional illusion of depth.

BACKGROUND OF THE INVENTION

Various types of vehicular specialty lighting are available in the prior art for accentuating illumination. In the area of motorcycles, it is a common practice to use strobe and halo effects, backlighting, different patterns on lenses, multi-bulb lights, halogen lights, LEDs, light pipes, diffusers, reflectors and the like for customization. On motorcycles, cars, trucks, semi-trailers, ATVs, snowmobiles, SUVs, boats, jet skis, and other conveyances, lights are being utilized in many different locations for decoration to satisfy the individual desires or tastes of the owners and drivers.

Some types of vehicle specialty lighting have employed different combinations of lights with mirrors for providing backlighting and silhouette effects, and improving instrument display recognizability. It is believed that prior art vehicle specialty lighting devices present images in two-dimensional displays. However, it remains highly desirable to provide a vehicular lighting arrangement in which illumination is produced as an eye catching, 3-D virtual image or optical illusion that enables one to create a unique and distinctive signature vehicle.

SUMMARY OF THE INVENTION

It is a general object of the present invention to provide a lighting arrangement for markedly enhancing the lighting effect of various vehicles.

It is one object of the present invention to provide an arrangement which seemingly creates an infinity effect or endless tunnel of lights in different vehicular applications.

It is also an object of the present invention to provide a battery powered, light and mirror arrangement defining a field of depth lighting in moving conveyances.

It is another object of the present invention to provide a vehicular lighting arrangement which employs a small number of commercially available components so that the finished product may be mass produced at a reasonable cost.

It is a further object of the present invention to provide a three dimensional lighting image from a compact vehicular enclosure wherein the image created is substantially greater than expected from the actual size of the enclosure.

It is an additional object of the present invention to provide a distantly converging lighting effect to increase the visual appeal and enhance the appearance of a vehicle.

In one aspect of the invention, an infinity effect vehicular lighting arrangement includes a hollow vehicular lighting housing adapted to be mounted on a vehicle. The housing has an interior surface particularly shaped for a desired function and portion of the vehicle. A two-way mirror has a fully reflective surface and a peripheral surface correspondingly shaped to fit in and be fixed to the interior surface of the vehicular lighting housing at a rear portion thereof. A flexible strip is disposed immediately adjacent and in front of the two-way mirror. At least one edge of the strip is engaged against the two-way mirror. The flexible strip has an outer surface fixed to the interior surface of the vehicular lighting housing, and an inner reflective surface holding a plurality of serially connected, spaced apart, light emitting sources extending radially inwardly into an open cavity defined by the strip. A one-way mirror is held in spaced, parallel relationship from the two-way mirror, and is positioned immediately adjacent and forwardly of the flexible strip such that a portion of the one-way mirror engages another edge of the flexible strip. The one-way mirror has at least a partially transparent front surface, a partially reflective rear surface facing the fully reflective mirror surface of the two-way mirror, and a peripheral surface correspondingly shaped to fit in and be fixed to the interior surface of the vehicular lighting housing at a front portion thereof. A transparent cover glass is placed forwardly of the one-way mirror and has a peripheral surface correspondingly shaped to fit in and be fixed to the interior surface of the vehicular lighting housing at a forwardmost portion thereof. A battery is adapted to be mounted on the vehicle and is connected to the light emitting sources for providing electrical power to illuminate the sources in the open cavity defined by the strip. The flexible strip is compactly sandwiched between the two-way mirror and the one-way mirror. When the light sources are illuminated, light reflects back and forth between the two-way mirror and the one-way mirror to present through the cover glass a series of constantly, rearwardly converging light streams forming an endless tunnel of light.

Both the two-way mirror and the one-way mirror are preferably planar. In one application, the vehicular lighting housing is the exterior shell of a dashboard instrument. In the preferred embodiment, the light sources are preferably LEDs. The flexible strip may include at least two spaced apart rows of LEDs. The peripheral surfaces of the two-way mirror, the reflective strip, the one-way mirror and the cover glass are bonded to the interior surface of the vehicular lighting housing by an adhesive. The light sources are connected to the battery by wiring running axially along the interior surface of the vehicular lighting housing. One application has the vehicular lighting being a speedometer housing. In the speedometer application, the partially transparent front surface of the one-way mirror is provided with indicia and a movable indicator needle movable along the indicia. Also in such application, the two-way mirror and the one-way mirror are provided with aligned openings adapted to receive a rod for moving the indicator needle. In another application, the vehicular lighting housing is constructed and arranged to provide multiple endless tunnels of light in spaced apart relationship. The vehicular lighting housing may take the form of a tail light housing, a clearance light housing, an exhaust manifold housing, a motorcycle cover plate or an air cleaner housing.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
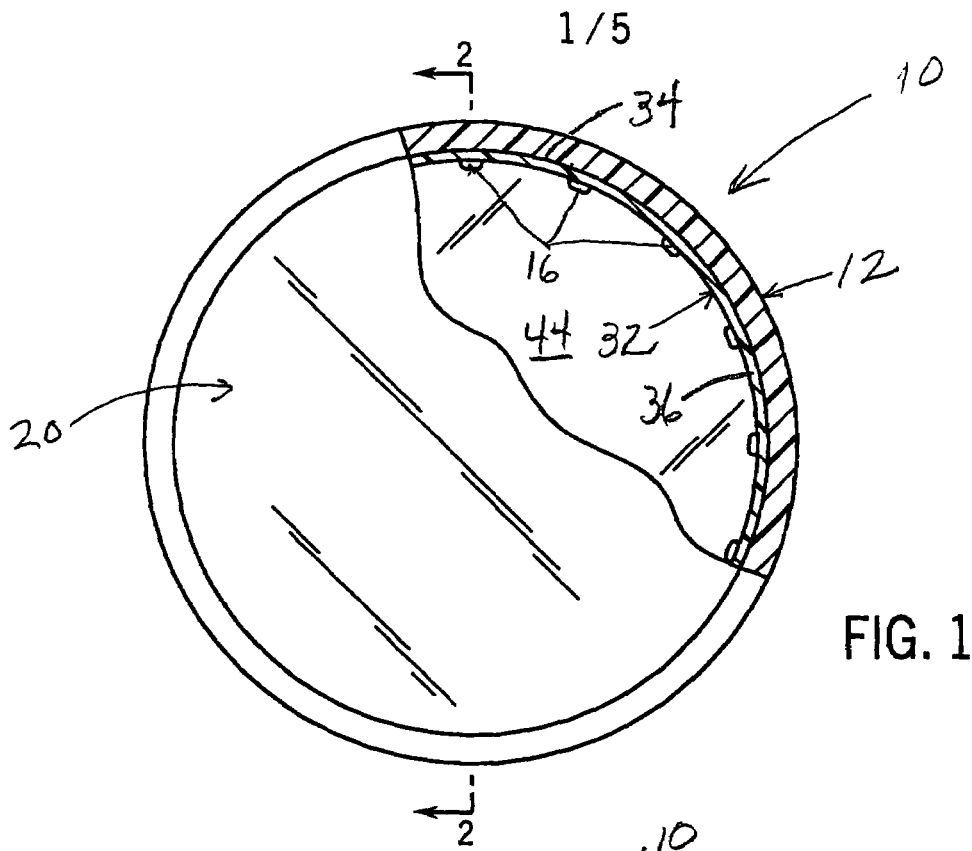
FIG. 1 is a front view partially broken away and illustrating a vehicular lighting arrangement embodying the present invention, the lighting arrangement being de-energized.
Figure 2:
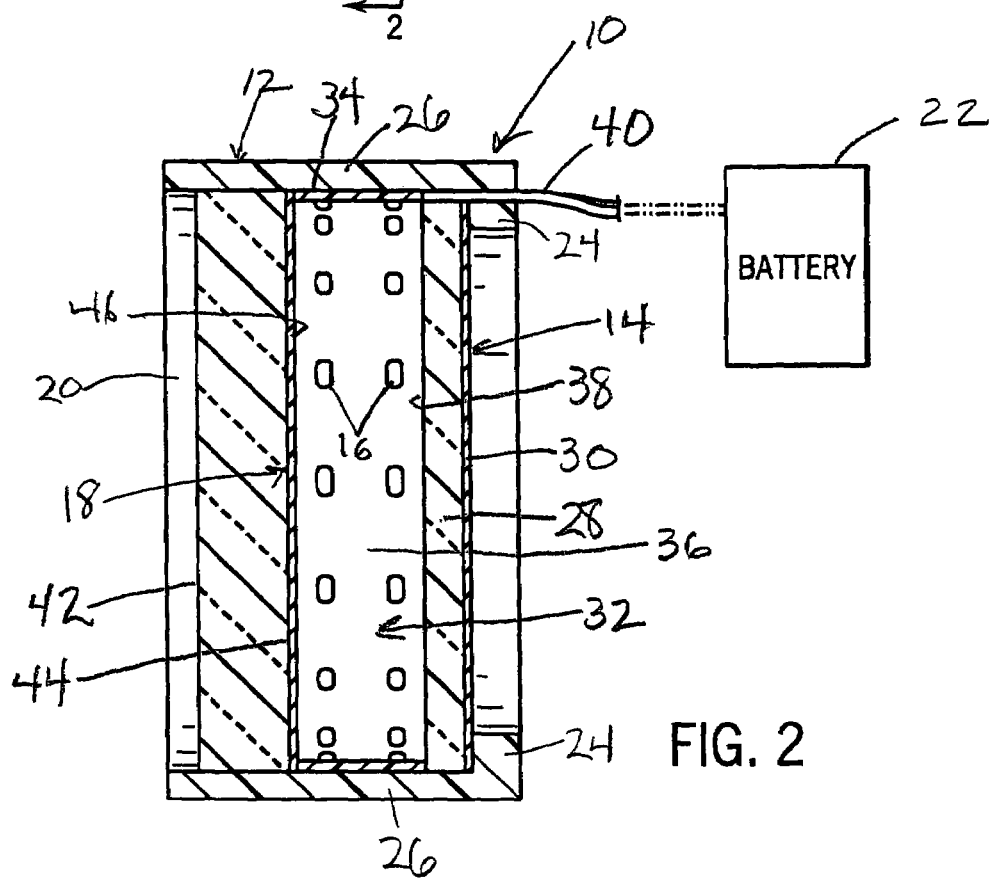
FIG. 2 is a sectional view of the arrangement taken on line 2—2 of FIG. 1.
Figure 3:
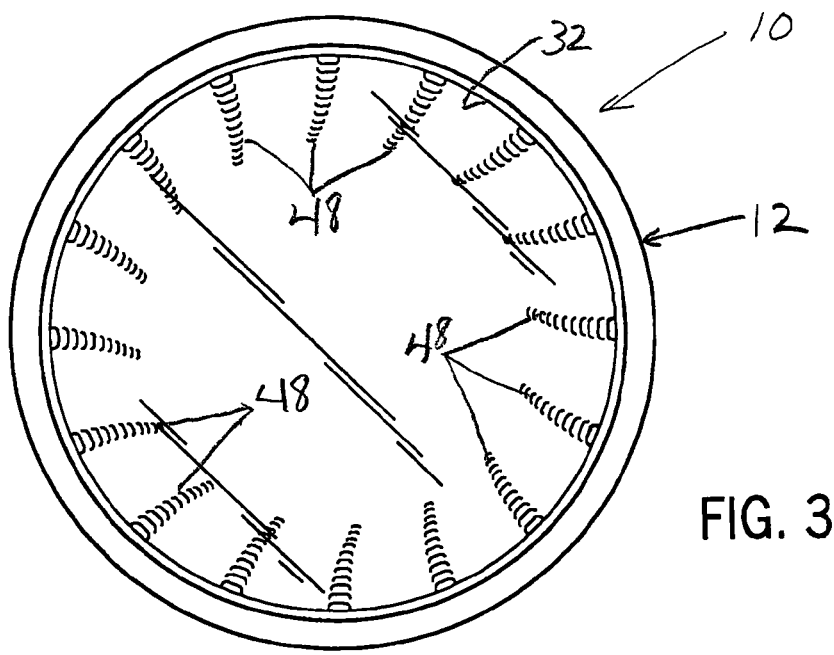
FIG. 3 is a front view of the vehicular lighting arrangement of FIG. 1 in an energized condition and illustrating an infinity effect.

Referring initially to FIGS. 1, 2 and 3, thereshown is a vehicular lighting arrangement 10 which utilizes an assembly of mirrors and a light source to provide what is described as an infinity effect. The infinity effect enables a person viewing the arrangement 10 to visually experience a plurality of peripheral light streams or paths which continually converge down a virtual endless tunnel to define a stimulating visual image.

The vehicular lighting arrangement 10 is generally comprised of the vehicular lighting housing 12, a regular or two-way planar mirror 14, a plurality of light sources 16, a one-way planar mirror 18 held in spaced, parallel relationship from one-way mirror 14, a cover glass 20 and a battery 22.

The vehicular lighting housing 12 may be configured in any shape and size but, in the exemplary embodiment of FIGS. 1–3, is shown as being hollow, cylindrical and open at the front and rear. The housing 12 may be constructed if desired with an inwardly extending rear portion 24 which cooperates with a sidewall 26 to define a retaining corner defining a rear stop for the two-way mirror 14. Although not shown, the interior of the housing 12 may be designed to accommodate other components depending on the particular vehicular application. The housing 12 is typically used as an enclosure for a tail light, turn signal, side or marker light, speedometer, tachometer, sun roof, exhaust manifold, and other components of a car, motorcycle, truck, semi-trailer, ATV, snowmobile, SUV, boat, jet ski, plane or other vehicle. The housing 12 is fabricated from any material desired such as wood, metal, plastic and is normally provided with suitable attachment hardware (not shown) for enabling securement to a desired portion of a vehicle.

As illustrated in FIG. 2, regular or two-way mirror 14 is a fully reflective, circular mirror which typically may be a glass pane 28 having a rear reflecting surface 30 with a conventional silver coating. Alternatively, the reflecting surface 30 could be on the front of pane 28. In addition, the mirror 14 can be manufactured in any material such as metal, plastic or acrylic having a fully reflective surface. The mirror 14 is sized and shaped to fit within the interior of the housing 12. In the preferred embodiment, a curved or rounded periphery of the mirror 14 is coated with a suitable adhesive and is bonded to the interior surface of the housing 12 to fix the mirror 14 in position at the rear of the housing 12.

The plurality of light sources 16 is disposed immediately adjacent and in front of the two-way mirror 14. In the preferred embodiment, the light sources 16 are chosen as serially connected, light emitting diodes (LEDs) which extend radially inwardly into the interior housing 12 from a flexible strip 32. LEDs 16 are particularly advantageous as light sources because they are long lasting, resistant to shock and vibration inflicted during vehicular travel and require a low level of electrical power. The strip 32 has an outer surface 34 which is bonded by adhesive to the interior periphery of housing 12, and an inner reflective surface 36 from which the LEDs 16 project. One edge 38 of the strip 32 lies against the outer periphery of mirror 14. The strip 32 is shown provided with two parallel rows of LEDs 16 which completely encircle the interior periphery of the housing 12. It should be understood however that the strip 32 can be sized as preferred to hold different numbers and various patterns or arrays of LEDs 16 which may be of a single color or multiple colors to attain the desired effect. Generally speaking, the greater number and color variety of LEDs 16, the more stunning the infinity effect produced. The LEDs 16 are electrically powered by the battery 22 which is variously located on the vehicle equipped with the light arrangement 10. The battery 22 is connected to the LEDs 16 by suitable wiring 40 routed axially along the housing interior surface.

As used herein, the term LED should be understood to include white LEDs, infrared LEDs, ultraviolet LEDs, visible color LEDs, organic LEDs and all of the types of light emitting diodes. However, the LED is one preferred type of light source 16. The term light source is meant to more broadly embrace incandescent lamps, filament lamps, neon, optic light tubes, halogen light bulbs, tungsten light bulbs and any other luminescent device designed to primarily illuminate a space, material, object or subject.

The one-way mirror 18 is positioned directly next to and forwardly of the light source strip 32 in the forward portion of housing 12. The one-way mirror 18 has a substantially transparent or translucent front circular surface 42 which can be viewed from the front of the housing 12, and a rear partially reflective circular surface 44 which faces the reflecting surface 30 of the two-way mirror 14. The partially reflecting surface 44 has a periphery in contact with another edge 46 of the strip 32. A curved or rounded periphery of the mirror 18 is affixed to the interior surface of housing 12 by an adhesive. The cover glass 20 is circular and transparent, and has a diameter substantially equal to that of the mirrors 14 and 18. The periphery of the cover glass 20 is provided with a suitable adhesive for fixing the cover glass 20 in recessed fashion at the forwardmost interior surface of the housing 12.

In the assembly of FIG. 2, it can be appreciated that the two-way mirror 14, the light sources or LEDs 16, the one-way mirror 18 and the cover glass 20 are tightly sandwiched together in fixed, compact relationship within vehicular housing 12. An open cavity is created between the two mirrors 14 and 18 wherein light from the energized LEDs 16 can travel back and forth. One applying power from the battery 22 to the LEDs 16 such as by using a switch (not shown) will enable light to be reflected back and forth between the mirrors 14 and 18. Such continuous light reflection is viewed by a person looking through the one-way mirror 18 at the front of the housing 12 as what appears to be a three-dimensional optical illusion in the form of an endless tunnel of light streams 48 as shown in FIG. 3. These light streams 48 seem to be constantly converging and successively diminishing to a distant point rearwardly of the perceived tunnel. The resulting virtual image enables owners of a wide variety of vehicles to create a highly attractive customization which enhances the overall appearance of their vehicles, particularly when different or multiple color LEDs 16 are utilized. Such infinity lighting arrangement 10 has not heretofore been used to improve lighting on vehicles.

As will be understood below, the vehicular lighting housing 12 may be configured in any shape and size. The interior contour of the particularly shaped housing 12 will dictate corresponding shapes and peripheries of the mirrors 14 and 18, the LED strip 32 and the cover glass 20. Also, it is to be noted that the plurality of light sources or LEDs 16 may be otherwise suitably mounted without the strip 32 such that they extend radially inwardly from the housing interior.

Figure 4:
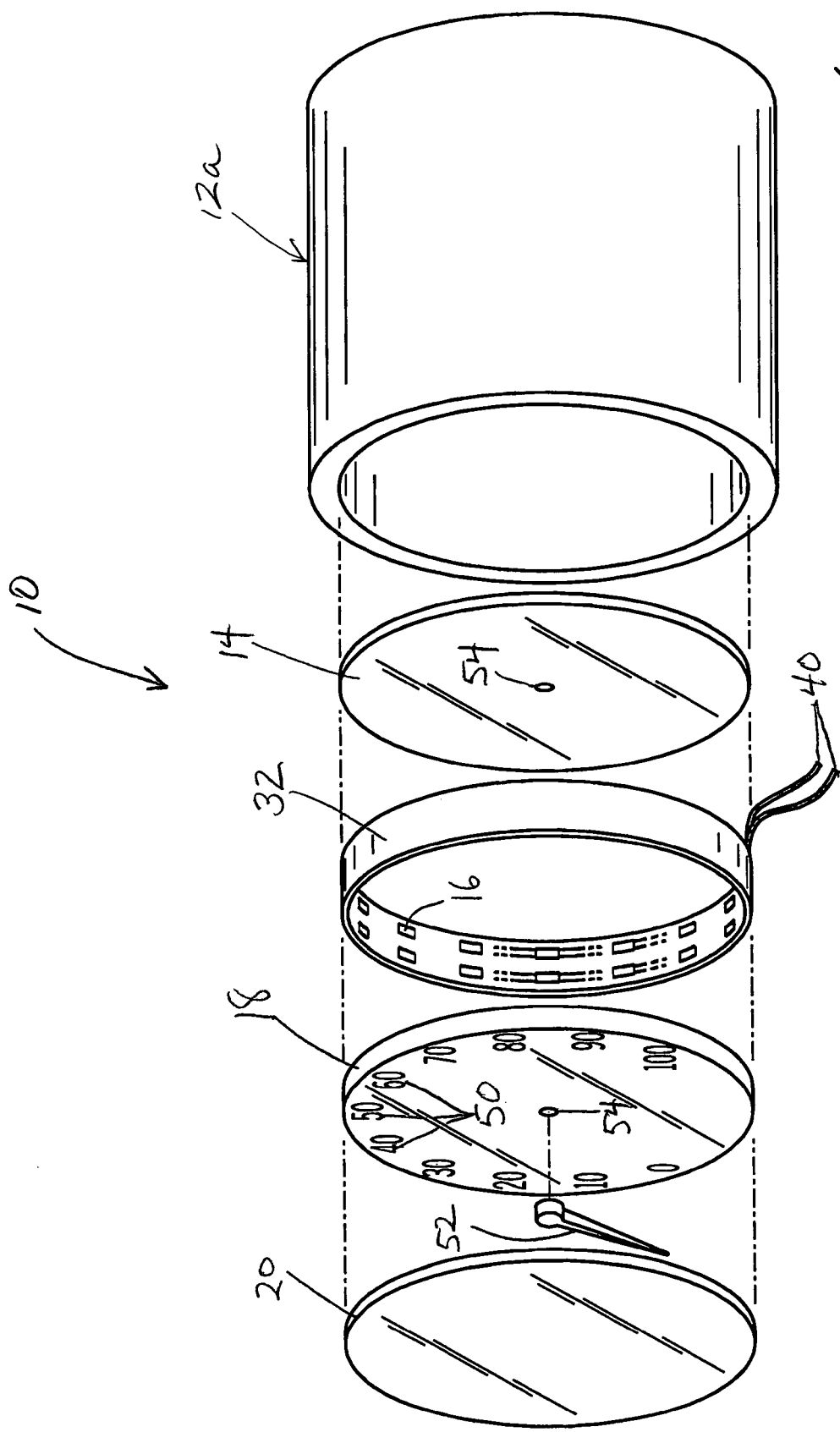
FIG. 4 is an exploded view of an alternative embodiment of a vehicular lighting arrangement used in a speedometer.

Referring now to FIG. 4, the present invention as described above is shown as used in a motorcycle speedometer housing 12*a* with mirrors 14 and 18, flexible LED strip 32 and cover glass 20 assembled substantially as set forth above. In this application, the darkened but translucent front face of one-way mirror 18 is provided with indicia 50 representative of the speed of the motorcycle as well as a movable indicator needle 52. Cover glass 20 would be slightly spaced forwardly to allow for the movable needle 52. Although not illustrated, the rear of the speedometer housing 12*a* would be designed to carry the necessary components for driving the needle 52 responsive to the velocity of the motorcycle tires. The mirrors 14 and 18 are suitably formed with central openings 54 to receive a turning rod or the like. Of course, similar applications can be applied on speedometers, tachometers, temperature gauges, fuel gauges and other dash board accessories on many vehicles and on many wheeled and tracked vehicles, as well as marine vehicles and airplanes. In this way, the functionality of a working instrument display is enhanced by the infinity lighting effect of the present invention.

Figure 5:
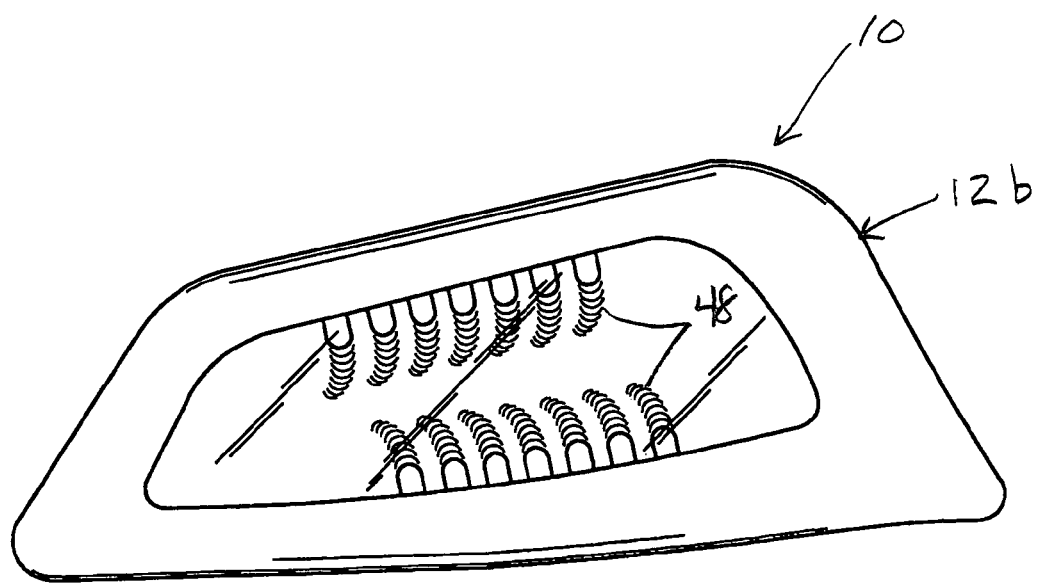
FIG. 5 is a front view of an energized vehicular lighting arrangement used in side lights on a semi-trailer.

FIG. 5 depicts the lighting arrangement 10 as used in a clearance light, side light or marker light housing 12*b* such as installed on a semi-trailer. In this version, the LEDs 16 have been distributed along the top and bottom only of the strip 32 for the desired effect.

Figure 6:
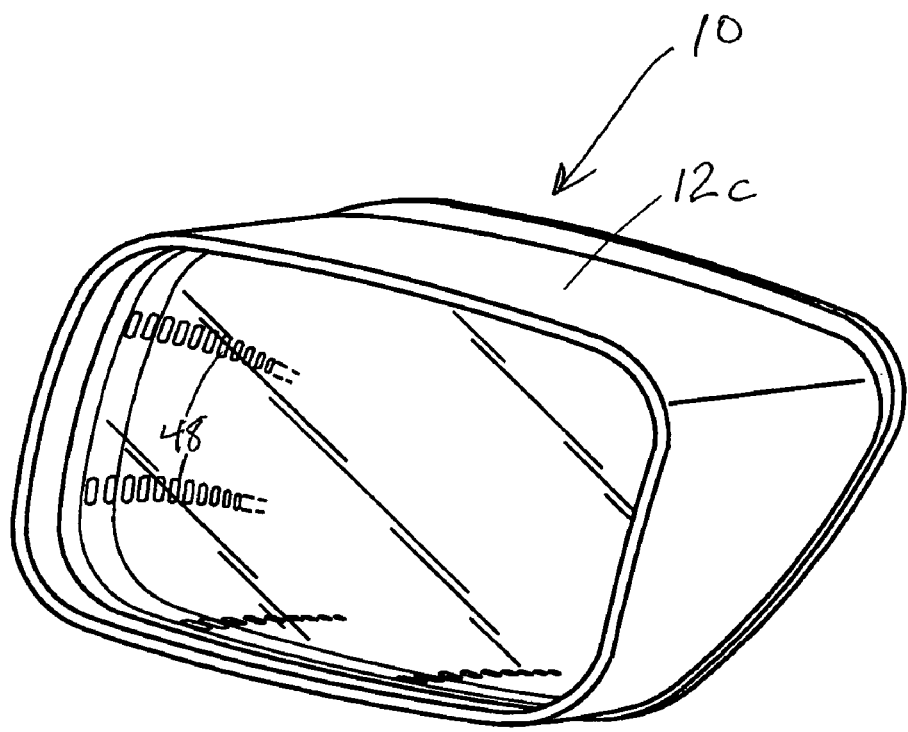
FIG. 6 is a perspective view of an energized vehicular lighting arrangement used in a tail light.

FIG. 6 discloses the present invention as used on a substantially rectangular tail light housing 12*c* for a motorcycle, car, truck, trailer or other vehicle.

Figure 7:
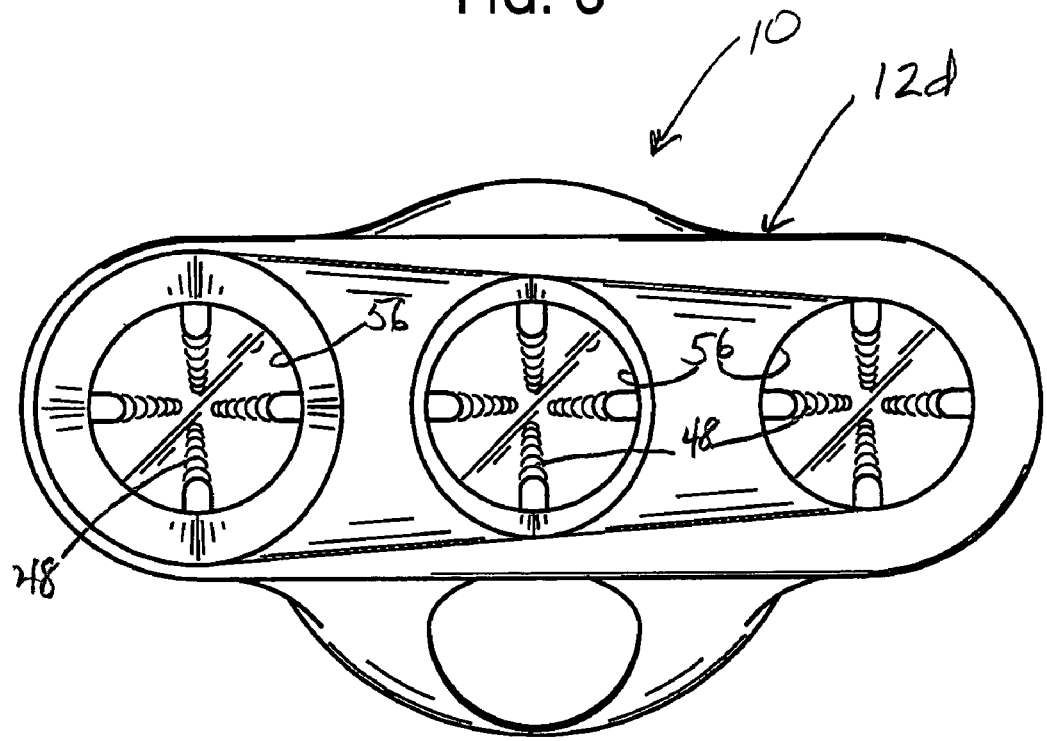
FIG. 7 is a front view of an energized vehicular lighting arrangement used in an exhaust manifold.

FIG. 7 shows the present invention as applied to a motorcycle exhaust manifold housing 12*d* wherein each of the three exhaust ports 56 is provided with individual lighting arrangements 10. The present invention again adds eye catching appeal to an exhaust manifold housing 12*d* which normally is attractive only by virtue of its chrome finish.

Figure 8:
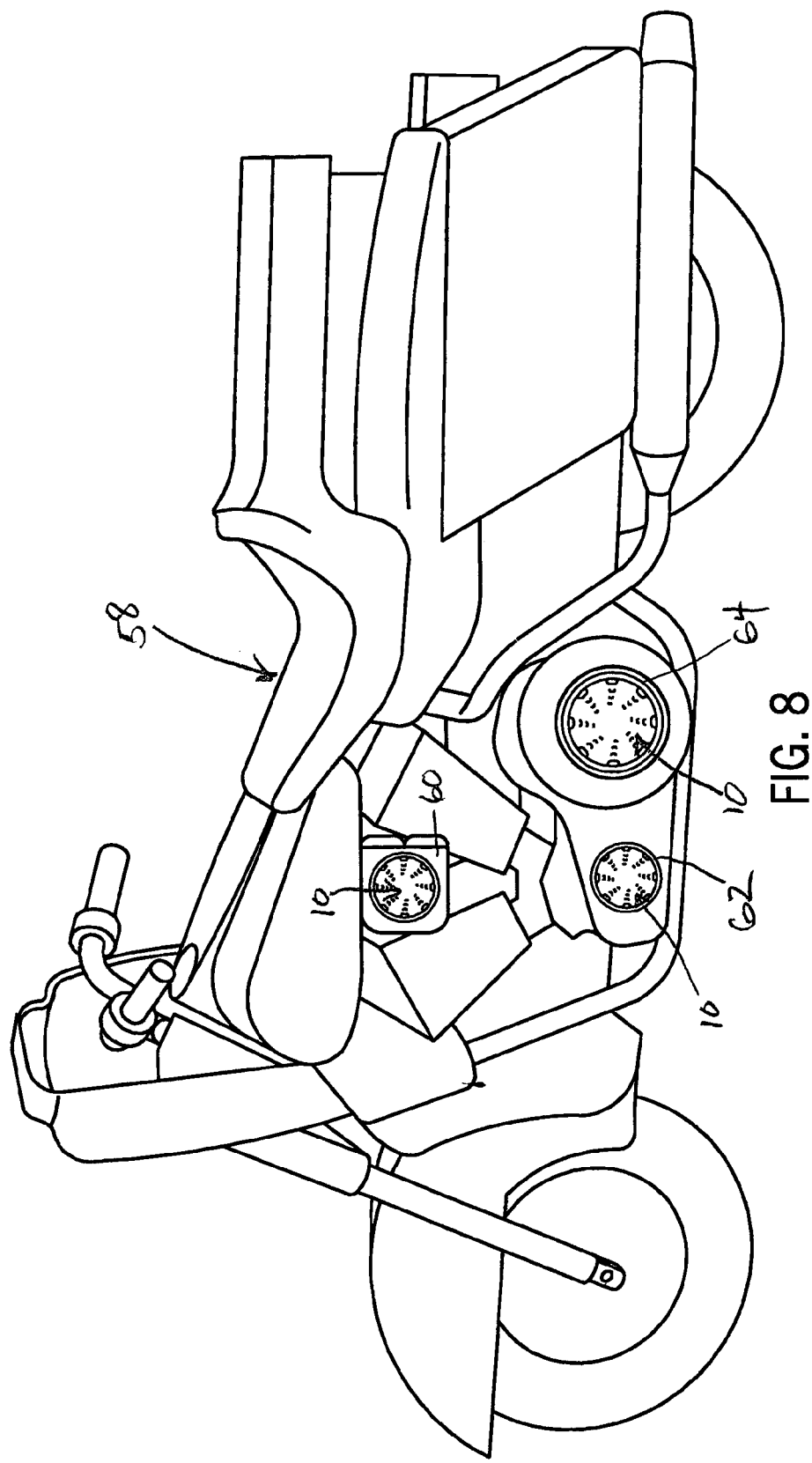
FIG. 8 is a side view of a motorcycle having multiple energized vehicle lighting arrangements on an air cleaner and motor cover plates.

FIG. 8 illustrates a motorcycle 58 wherein an air cleaner 60 and cover plates 62, 64 are provided with the lighting arrangement 10 as to custom light the side of the motorcycle.

As previously mentioned, the present invention provides an infinity effect lighting arrangement 10 to enhance illumination on vehicles including, but not limited to, motorcycles, cars, trucks, trailers, semi-trailers, SUVs, snowmobiles, ATVs, boats, jet skis, and airplanes. Although not specifically disclosed herein, other visual or audio effects may also be added to the lighting arrangement 10 of the present invention without diminishing the scope or protection thereof.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

I claim:

1. An infinity effect vehicular lighting arrangement comprising:
   a hollow, vehicular lighting housing mounted on a vehicle, the housing having an interior surface particularly shaped for a desired function and portion of the vehicle;
   a rigid, planar two-way mirror having a fully reflective surface and a peripheral surface correspondingly shaped to fit in and be fixed to the interior surface of the vehicular lighting housing at a rear portion thereof;
   a flat flexible strip disposed immediately adjacent and in front of the two-way mirror, at least one edge of the strip being engaged against the two-way mirror, the flat flexible strip having an outer planar surface fixed across an entire constant width thereof flush against the interior surface of the vehicular lighting housing, and an inner reflective surface holding a plurality of serially connected, spaced apart, light emitting sources extending radially inwardly into an open cavity having a periphery defined by the strips;
   a rigid, planar, inflexible one-way mirror constantly held in equidistantly spaced, parallel relationship from the two-way mirror and positioned immediately adjacent and forwardly of the flexible strip such that a portion of the one-way mirror engages another edge of the flexible strip, the one-way mirror having at least a partially transparent front surface, and a partially reflective rear surface facing the fully reflective mirror surface of the two-way mirror, and a peripheral surface correspondingly shaped to fit in and be fixed to the interior surface of the vehicular lighting housing at a front portion thereof;
   a planar, transparent, cover glass extending entirely across and placed forwardly of and against the one-way mirror and having a peripheral surface correspondingly shaped to fit in and be fixed to the interior surface of the vehicular lighting housing at a forwardmost portion thereof;
   a battery mounted on the vehicle and connected to the light emitting sources for providing electrical power to illuminate the sources in the open cavity bounded by the strip, the two-way mirror and the one-way mirror,
   the flexible strip being compactly sandwiched between the two-way mirror and the one-way mirror,
   whereby when the light sources are illuminated, light reflects back and forth between the two-way mirror and the one-way mirror to present through the cover glass a series of constantly rearwardly, converging light streams forming an endless tunnel of light, the vehicular lighting housing is the exterior shell of a dashboard instrument of the vehicle.

2. The vehicular lighting arrangement of claim 1, wherein the light sources are LEDs.

3. The vehicular lighting arrangement of claim 2, wherein the flexible strip includes at least two spaced apart rows of LEDs.

4. The vehicular lighting arrangement of claim 1, wherein the peripheral surfaces of the two-way mirror, the reflective strip, the one-way mirror and a cover glass are bonded to the interior surface of the vehicular lighting housing by an adhesive.

5. The vehicular lighting arrangement of claim 1, wherein the light sources are connected to the battery by wiring running axially along the interior surface of the vehicular lighting housing.

6. The vehicular lighting arrangement of claim 1, wherein the vehicular lighting housing is a speedometer housing.

7. The vehicular lighting arrangement of claim 1, wherein the partially transparent front surface of the one-way mirror is provided with indicia and a movable indicator needle movable along the indicia.

8. The vehicular lighting arrangement of claim 7, wherein the two-way mirror and the one-way mirror are provided with aligned openings adapted to receive a rod for moving the indicator needle.

9. The vehicular lighting arrangement of claim 1, wherein the vehicular lighting housing is constructed and arranged to provide multiple endless tunnels of light in spaced apart relationship.

10. The vehicular lighting arrangement of claim 1, wherein the vehicular lighting arrangement is a tail light housing.

11. The vehicular lighting arrangement of claim 1, wherein the vehicular lighting housing is a clearance light housing.

12. The vehicular lighting arrangement of claim 1, wherein the vehicular lighting housing is an exhaust manifold housing.

13. The vehicular lighting arrangement of claim 1, wherein the vehicular lighting housing is a motorcycle cover plate.

14. The vehicular lighting arrangement of claim 1, wherein the vehicular lighting housing is an air cleaner housing.

15. An infinity effect vehicular lighting arrangement comprising:
   a hollow, vehicular lighting housing adapted to be mounted on a vehicle, the housing having an interior surface particularly shaped for a desired function and portion of the vehicle;
   a two-way mirror having a fully reflective surface and a peripheral surface correspondingly shaped to fit in and be fixed to the interior surface of the vehicular lighting housing at a rear portion thereof;
   a flexible strip disposed immediately adjacent and in front of the two-way mirror, at least one edge of the strip being engaged against the two-way mirror, the flexible strip having an outer surface fixed to the interior surface of the vehicular lighting housing, and an inner reflective surface holding a plurality of serially connected, spaced apart, light emitting sources extending radially inwardly into an open cavity defined by the strip;
   a one-way mirror held in spaced, parallel relationship from the two-way mirror and positioned immediately adjacent and forwardly of the flexible strip such that a portion of the one-way mirror engages another edge of the flexible strip, the one-way mirror having at least a partially transparent front surface, and a partially reflective rear surface facing the fully reflective mirror surface of the two-way mirror, and a peripheral surface correspondingly shaped to fit in and be fixed to the interior surface of the vehicular lighting housing at a front portion thereof;
   a transparent, cover glass placed forwardly of the one-way mirror and having a peripheral surface correspondingly shaped to fit in and be fixed to the interior surface of the vehicular lighting housing at a forwardmost portion thereof;
   a battery adapted to be mounted on the vehicle and connected to the light emitting sources for providing electrical power to illuminate the sources in the open cavity defined by the strip,
   the flexible strip being compactly sandwiched between the two-way mirror and the one-way mirror,
   whereby when the light sources are illuminated, light reflects back and forth between the two-way mirror and the one-way mirror to present through the cover glass a series of constantly rearwardly, converging light streams forming an endless tunnel of light,
   wherein the vehicular lighting housing is the exterior shell of a dashboard instrument of the vehicle, and
   wherein the partially transparent front surface of the one-way mirror is provided with indicia and a movable indicator needle movable along the indicia.

16. The vehicular lighting arrangement of claim 15, wherein the two-way mirror and the one-way mirror are provided with aligned openings adapted to receive a rod for moving the indicator needle.

17. The vehicular lighting arrangement of claim 15, wherein the vehicular lighting housing is a speedometer housing.

* * * * *